(12) United States Patent
Fujimoto

(10) Patent No.: US 11,791,498 B2
(45) Date of Patent: Oct. 17, 2023

(54) LITHIUM SECONDARY BATTERY

(71) Applicant: Panasonic Intellectual Property Management Co., Ltd., Osaka (JP)

(72) Inventor: Masahisa Fujimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 706 days.

(21) Appl. No.: 16/989,906

(22) Filed: Aug. 11, 2020

(65) Prior Publication Data

US 2020/0373621 A1 Nov. 26, 2020

Related U.S. Application Data

(63) Continuation of application No. PCT/JP2019/020002, filed on May 21, 2019.

(30) Foreign Application Priority Data

Jun. 19, 2018 (JP) ................................. 2018-116298

(51) Int. Cl.
*H01M 10/0567* (2010.01)
*H01M 4/134* (2010.01)
*H01M 10/0525* (2010.01)
*H01M 10/0569* (2010.01)
*H01M 4/38* (2006.01)
*H01M 4/02* (2006.01)
*H01M 50/417* (2021.01)
*H01M 50/497* (2021.01)

(52) U.S. Cl.
CPC ....... *H01M 10/0567* (2013.01); *H01M 4/134* (2013.01); *H01M 10/0525* (2013.01);
(Continued)

(58) Field of Classification Search
CPC ............ H01M 10/0567; H01M 4/134; H01M 10/0569; H01M 4/38
See application file for complete search history.

(56) References Cited

U.S. PATENT DOCUMENTS 7,141,187 B2 11/2006 Kosuzu et al.
2004/0142247 A1 7/2004 Yoshimura et al.
(Continued)

FOREIGN PATENT DOCUMENTS

JP 2001-023690 1/2001
JP 2004-220961 8/2004
(Continued)

OTHER PUBLICATIONS

International Search Report of PCT application No. PCT/JP2019/020002 dated Aug. 27, 2019.

*Primary Examiner* — Sarah A. Slifka
(74) *Attorney, Agent, or Firm* — McDermott Will & Emery LLP

(57) ABSTRACT

The lithium secondary battery of the present disclosure comprises an anode including an anode current collector and an anode active material; an electrolyte liquid; and a cathode including a cathode active material layer disposed on a cathode current collector. The anode includes a material capable of forming an alloy with lithium during charge. The electrolyte liquid contains lithium ions and the counter anions thereof, contains at least one substance selected from the group consisting of phenanthrene, biphenyl, triphenylene, acenaphthene, acenaphthylene, fluoranthene, and benzyl at a concentration of not less than 0.00625 mol/L and not more than 0.05 mol/L, and includes, as a solvent, at least one selected from the group consisting of a cyclic ether, a glyme, and a sulfolane.

7 Claims, 9 Drawing Sheets

(52) U.S. Cl.
CPC .......... *H01M 10/0569* (2013.01); *H01M 4/38* (2013.01); *H01M 4/382* (2013.01); *H01M 4/386* (2013.01); *H01M 50/417* (2021.01); *H01M 50/497* (2021.01); *H01M 2004/027* (2013.01); *H01M 2300/0028* (2013.01); *H01M 2300/0037* (2013.01)

(56) References Cited

U.S. PATENT DOCUMENTS

| | | |
|---|---|---|
| 2013/0122353 A1 | 5/2013 | Kawasaki et al. |
| 2018/0048004 A1 | 2/2018 | Hojo |
| 2018/0097247 A1 | 4/2018 | Nariyama et al. |

FOREIGN PATENT DOCUMENTS

| | | |
|---|---|---|
| JP | 3733065 B | 1/2006 |
| JP | 2006-309965 | 11/2006 |
| JP | 2009-533799 | 9/2009 |
| JP | 4898737 B | 3/2012 |
| JP | 2014-192042 | 10/2014 |
| JP | 2018-060782 | 4/2018 |
| WO | 2007/116363 | 10/2007 |
| WO | 2012/029578 | 3/2012 |
| WO | 2016/208123 | 12/2016 |

LITHIUM SECONDARY BATTERY

BACKGROUND

1. Technical Field

The present disclosure relates to a lithium secondary battery.

2. Description of the Related Art

Characteristics of lithium secondary batteries change depending on the kind of active materials. For example, if a lithium metal is used as an anode active material, a lithium secondary battery having a high energy density can be provided. However, if the lithium metal is used as the anode active material, the lithium metal may be deposited in a dendrite shape during charge of the lithium secondary battery, which causes an internal short circuit. In addition, the deposited lithium metal is very active, since the deposited lithium metal is formed of atomic groups. The deposited lithium metal reacts with an electrolyte solvent, and a part thereof is turned into an inactive organic lithium compound. As a result, a problem that charge/discharge efficiency is decreased occurs. Various kinds of solvents have been studied to suppress the reactivity with the solvent; however, no particularly excellent solvent has been found.

On the other hand, if graphite is used as the anode active material, it is possible to prevent a lithium metal from being deposited in the dendrite shape during the charge. The reaction in which lithium ions are inserted between graphite layers and the reaction in which the lithium ions are desorbed from the graphite layers are topotactic reactions and have excellent reversibility. For these advantages, lithium secondary batteries using graphite as the anode active material have been put to practical use.

However, the lithium ion insertion reaction between the graphite layers is significantly affected by the electrolyte solvent. For the lithium secondary battery, carbonate ester is generally used as a solvent in view of a width of a potential window (reduction resistance and oxidation resistance), viscosity, and ionic conductivity when a lithium salt is dissolved. However, if cyclic carbonates in which one of the hydrogen atoms has been substituted with an alkyl group, such as propylene carbonate or butylene carbonate, are used, the solvent is decomposed and lithium ions fail to be inserted. On the other hand, lithium ions can be inserted, if an unsubstituted ethylene carbonate, a chloroethylene carbonate, a fluoroethylene carbonate or a chain carbonate which has been substituted with halogen is used.

CITATION LIST

Patent Literature

Patent Literature 1: Japanese Patent Publication No. 4898737
Patent Literature 2: Japanese Patent Publication No. 3733065

SUMMARY

A theoretical capacity density of a lithium metal is 3,884 mAh/g. On the other hand, a theoretical capacity density of graphite is 372 mAh/g, which is approximately 1/10 times the theoretical capacity density of the lithium metal. The capacity density of graphite in an actual lithium secondary battery is also approaching the theoretical capacity density, and it is difficult to further increase the capacity of a lithium secondary battery using graphite as an anode active material.

As an anode active material in place of graphite, a material capable of forming an alloy with lithium has attracted attention. Aluminum, silicon, and tin are known as the material capable of forming an alloy with lithium. The theoretical capacity density of these materials is much higher than the theoretical capacity density of graphite. However, lithium secondary batteries using these materials have low charge/discharge reversibility, namely, a poor cycle characteristic.

The present disclosure provides a lithium secondary battery having excellent cycle characteristic.

The present disclosure provides a lithium secondary battery comprising:
  a cathode;
  an anode including an anode current collector and an anode active material; and
  an electrolyte liquid which is in contact with the cathode and the anode,
  wherein
  the cathode includes a cathode current collector and a cathode active material layer which has been disposed on the cathode current collector;
  the anode includes a material capable of forming an alloy with lithium during charge,
  the electrolyte liquid contains lithium ions and the counter anions thereof;
  the electrolyte liquid contains at least one substance selected from the group consisting of phenanthrene, biphenyl, triphenylene, acenaphthene, acenaphthylene, fluoranthene, and benzyl at a concentration of not less than 0.00625 mol/L and not more than 0.05 mol/L; and
  the electrolyte liquid includes, as a solvent, at least one selected from the group consisting of a cyclic ether, a glyme, and a sulfolane.

According to the present disclosure, a lithium secondary battery having excellent cycle characteristic can be provided.

Figure 1:
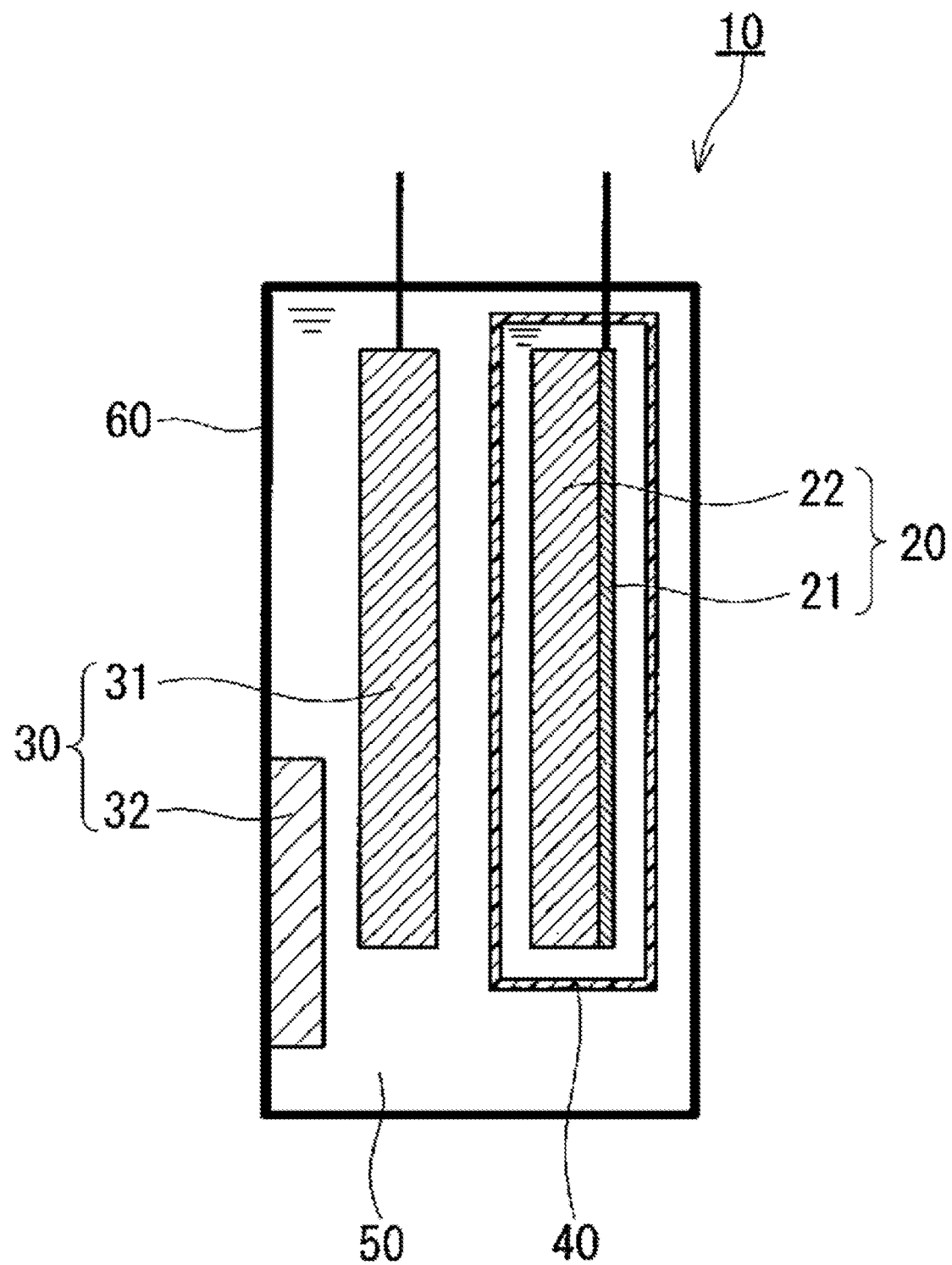
FIG. 1 is a schematic cross-sectional view of a lithium secondary battery according to an embodiment of the present disclosure.

DETAILED DESCRIPTION OF THE EMBODIMENT (Findings which established the fundamental of the present disclosure)

If materials such as aluminum, silicon, and tin are used as an anode active material of a lithium secondary battery, these materials electrochemically form an alloy with lithium during charge. In the present specification, these materials capable of forming an alloy with lithium are also referred to as "alloying materials".

An anode using an alloying material expands when occluding lithium and contracts when releasing the lithium. After the expansion and the contraction are repeated, the alloying material is pulverized and peeled from an anode current collector. Even if the alloying material stays in the anode, electrical contact between the alloying material and the anode current collector fails to be formed, and it is difficult to charge and discharge. In other words, at the time point that the expansion occurs during the charge, almost all of sites of the active material are separated from the current collector, and it is hardly possible to discharge. This phenomenon is a main reason for the poor reversibility of the lithium secondary battery using the alloying material.

Since this phenomenon has nothing to do with the electrolyte solvent, the reversibility is not improved, even if the kind of the solvent is changed.

The present inventors have diligently studied a technique for overcoming the above-mentioned problem caused by the charge/discharge mechanism of the alloying material. As a result, the present inventors have made the following lithium secondary battery of the present disclosure.

Summary of One Aspect According to Present Disclosure

The lithium secondary battery according to one aspect of the present disclosure has the following configuration.

The present disclosure provides a lithium secondary battery comprising:
a cathode;
an anode including an anode current collector and an anode active material; and
an electrolyte liquid which is in contact with the cathode and the anode,
wherein
the cathode includes a cathode current collector and a cathode active material layer which has been disposed on the cathode current collector;
the anode includes a material capable of forming an alloy with lithium during charge,
the electrolyte liquid contains lithium ions and the counter anions thereof;
the electrolyte liquid contains at least one substance selected from the group consisting of phenanthrene, biphenyl, triphenylene, acenaphthene, acenaphthylene, fluoranthene, and benzyl at a concentration of not less than 0.00625 mol/L and not more than 0.05 mol/L; and
the electrolyte liquid includes, as a solvent, at least one selected from the group consisting of a cyclic ether, a glyme, and a sulfolane.

According to the above aspect, even if the anode active material is pulverized, the charge and discharge of the lithium secondary battery can be surely performed through at least one selected from the group consisting of phenanthrene, biphenyl, triphenylene, acenaphthene, acenaphthylene, fluoranthene, and benzyl. For example, it is possible to provide a lithium secondary battery which uses a high-capacity alloying material as an anode active material and has a high energy density and an excellent cycle characteristic.

In addition, a reaction rate between the solvated electron formed of a charged substance and the cathode can be sufficiently lowered. As a result, a discharge capacity of the lithium secondary battery can be sufficiently ensured.

The cyclic ether may include at least one selected from the group consisting of 2-methyltetrahydrofuran, tetrahydrofuran, 1,3-dioxolan, and 4-methyl-1,3-dioxolan. In this way, a lithium secondary battery having excellent reversibility can be provided.

The glyme may include at least one selected from the group consisting of monoglyme, diglyme, triglyme, tetraglyme, and polyethylene glycol dimethyl ether. In this way, a lithium secondary battery having excellent reversibility can be provided.

The sulfolane may include 3-methylsulfolane. In this way, a lithium secondary battery having excellent reversibility can be provided.

The anode active material may include Al, a LiAl alloy may be generated during the charge, and a composition of the LiAl alloy may be at least one selected from the group consisting of $LiAl$, $Li_2Al_3$, and $Li_4Al_5$.

The anode active material may include Zn, and a LiZn alloy may be generated during the charge, and a composition of the LiZn alloy may be at least one selected from the group consisting of $Li_2Zn_3$, $LiZn_2$, $Li_2Zn_5$, $LiZn_4$, and $LiZn$.

The anode active material may include Si, a LiSi alloy may be generated during the charge, and a composition of the LiSi alloy may be at least one selected from the group consisting of $Li_{22}Si_5$, $Li_{13}Si_4$, $Li_7Si_3$, and $Li_{12}Si_7$.

The anode active material may include Sn, and a LiSn alloy may be generated during the charge, and a composition of the LiSn alloy may be at least one selected from the group consisting of $Li_{22}Sn_5$, $Li_7Sn_2$, $Li_{13}Sn_5$, $Li_7Sn_3$, $Li_5Sn_2$, $LiSn$, and $Li_2Sn_5$.

The anode active material may include Ge, a LiGe alloy may be generated during the charge, and a composition of the LiGe alloy may be at least one selected from the group consisting of $Li_5Ge_{22}$ and $Li_3Ge$.

The anode active material may include Cd, a LiCd alloy may be generated during the charge, and a composition of the LiCd alloy may be at least one selected from the group consisting of $LiCd_3$ and $Li_3Cd$.

The anode active material may include Bi, a LiBi alloy may be generated during the charge, and a composition of the LiBi alloy may be at least one selected from the group consisting of $LiBi$ and $Li_3Bi$.

According to the above aspect, a lithium secondary battery having a high energy density can be provided.

The separator may be formed of a material that allows passage of solvated electrons formed of lithium ions and the charged substance. Since there is a wide choice of materials for the separator, the degree of freedom in designing a lithium secondary battery is increased.

Hereinafter, the embodiment of the present disclosure will be described with reference to the drawings. The present disclosure is not limited to the following embodiment.

EMBODIMENT

FIG. 1 shows a cross section of a lithium secondary battery according to the embodiment of the present disclosure. The lithium secondary battery 10 comprises a cathode 20, an anode 30, and an electrolyte liquid 50. The electrolyte liquid 50 includes a solvent and an anode mediator, and is in contact with the cathode 20 and the anode 30. The anode mediator has been dissolved in the solvent of the electrolyte liquid 50. The anode 30 has an anode current collector 31 and an anode active material 32. The redox reaction of the anode active material 32 in the anode 30 proceeds via the anode mediator.

The lithium secondary battery 10 further comprises a container 60. The container 60 is hermetically sealed. The container 60 is formed of a material having insulation and corrosion resistance. The cathode 20, the anode 30, and the electrolyte liquid 50 are disposed in the container 60.

The cathode 20 has a cathode current collector 21 and a cathode active material layer 22. The cathode active material layer 22 is disposed on the cathode current collector 21. The cathode current collector 21 and the cathode active material layer 22 are in electrical contact with each other.

The cathode current collector 21 is formed of, for example, a material having electron conductivity such as stainless steel, copper, nickel, or carbon. A shape of the cathode current collector 21 is not particularly limited, and is, for example, a plate shape.

The cathode active material layer 22 is a layer including a cathode active material. The cathode active material may be a material having a characteristic of reversibly occluding and releasing lithium ions. Examples of the cathode active material include a transition metal oxide, a fluoride, a polyanion, a fluorinated polyanion, a transition metal sulfide, and a phosphorus oxide having an olivine structure. Examples of the transition metal oxide include $LiCoO_2$, $LiNiO_2$, and $Li_2Mn_2O_4$. Examples of the phosphorus oxide include $LiFePO_4$, $LiNiPO_4$, and $LiCoPO_4$. The cathode active material layer 22 may include a plurality of kinds of the cathode active materials. If the cathode active material 22 contains lithium in advance, the anode active material 32 does not have to include lithium. If the cathode active material 22 does not contain lithium, the anode active material 32 only needs to include lithium in advance.

The cathode active material layer 22 may include an additive such as a conductive agent, an ion conduction assistant agent, or a binder, if necessary.

The anode 30 has an anode current collector 31 and an anode active material 32. Both the anode current collector 31 and the anode active material 32 are immersed in the electrolyte liquid 50. In the present embodiment, the anode active material 32 is disposed apart from the anode current collector 31. According to such a configuration, the degree of freedom in designing the shapes and dimensions of the anode current collector 31 and the anode active material 32 is increased. The electrolyte liquid 50 including the anode mediator is present between the anode current collector 31 and the anode active material 32. Since the exchange of electrons between the anode active material 32 and the anode current collector 31 is performed via the anode mediator, it is not necessary to maintain direct contact between the anode current collector 31 and the anode active material 32. However, the anode active material 32 may be in direct contact with the anode current collector 31.

The anode current collector 31 has a surface which acts as a reaction field for the anode mediator. As the anode current collector 31, a material that is stable with respect to the electrolyte liquid 50 can be used. In addition, as the anode current collector 31, a material that is stable against an electrochemical reaction which is an electrode reaction can be used. For example, as the anode current collector 31, a material having electron conductivity such as metal or carbon can be used. Examples of the metal include stainless steel, iron, copper, and nickel.

The anode current collector 31 may have a structure in which the surface area has been increased. Examples of the structure having an increased surface area include a mesh, a nonwoven fabric, a surface-roughened plate, and a sintered porous body. If the anode current collector 31 has these structures, the oxidation reaction or reduction reaction of the anode mediator easily proceeds.

The anode active material 32 may have a property of occluding and releasing lithium.

During the charge of the lithium secondary battery 10, the anode mediator is reduced on the surface of the anode current collector 31. The reduced anode mediator is oxidized by the anode active material 32. The anode active material 32 occludes lithium.

During the discharge of the lithium secondary battery 10, the anode active material 32 which has occluded the lithium reduces the anode mediator and releases the lithium. The reduced anode mediator is oxidized on the surface of the anode current collector 31.

The anode active material 32 includes, for example, a material capable of forming an alloy with lithium during the charge. The anode active material 32 includes, for example, at least one selected from the group consisting of Al, Zn, Si, Sn, Ge, Cd, Pb, Bi, and Sb. If these alloying materials are used, a lithium secondary battery 10 having a high energy density can be provided.

The anode active material 32 may include Al. In this case, a LiAl alloy is generated during the charge of the lithium secondary battery 10. A composition of the LiAl alloy may be at least one selected from the group consisting of LiAl, $Li_2Al_3$, and $Li_4Al_5$.

The anode active material 32 may include Zn. In this case, a LiZn alloy is generated during the charge of the lithium secondary battery 10. A composition of the LiZn alloy may be at least one selected from the group consisting of $Li_2Zn_3$, $LiZn_2$, $Li_2Zn_5$, $LiZn_4$, and LiZn.

The anode active material 32 may include Si. In this case, a LiSi alloy is generated during the charge of the lithium secondary battery 10. A composition of the LiSi alloy may be at least one selected from the group consisting of $Li_{22}Si_5$, $Li_{13}Sia$, $Li_7Si_3$, and $Li_{12}Si_7$.

The anode active material 32 may include Sn. In this case, a LiSn alloy is generated during the charge of the lithium secondary battery 10. A composition of the LiSn alloy may be at least one selected from the group consisting of $Li_{22}Sn_5$, $Li_7Sn_2$, $Li_{13}Sn_5$, $Li_7Sn_3$, $Li_5Sn_2$, LiSn, and $Li_2Sn_5$.

The anode active material 32 may include Ge. In this case, a LiGe alloy is generated during the charge of the lithium secondary battery 10. A composition of the LiGe alloy may be at least one selected from the group consisting of $Li_5Ge_{22}$ and $Li_3Ge$.

The anode active material 32 may include Cd. In this case, a LiCd alloy is generated during the charge of the lithium secondary battery 10. A composition of the LiCd alloy may be at least one selected from the group consisting of $LiCd_3$ and $Li_3Cd$.

The anode active material 32 may include Pb. In this case, a LiPb alloy is generated during the charge of the lithium secondary battery 10. A composition of the LiPb alloy may be at least one selected from the group consisting of LiPb, $Li_3Pb$, $Li_5Pb_2$, $Li_4Pb$, and $Li_{10}Pb_3$.

The anode active material 32 may include Bi. In this case, a LiBi alloy is generated during the charge of the lithium secondary battery 10. A composition of the LiBi alloy may be at least one selected from the group consisting of LiBi and $Li_3Bi$.

The anode active material 32 may include Sb. In this case, a LiSb alloy is generated during the charge of the lithium secondary battery 10. A composition of the LiSb alloy may be at least one selected from the group consisting of $Li_2Sb$ and $Li_3Sb$.

The anode active material 32 may include at least one selected from the group consisting of Al, Zn, Si, Sn, Ge, Cd, Pb, Bi, and Sb. The anode active material 32 may include a carbon material such as graphite.

The anode active material 32 may be a carbon material such as graphite. The compound generated in the anode 30 during the charge of the lithium secondary battery 10 may be an alloy such as a LiAl alloy or a graphite intercalation compound such as $C_6Li$.

The shape of the anode active material 32 is not particularly limited. The anode active material 32 may be in a powder form or a pellet form. The anode active material 32 may be solidified with a binder. Examples of the binder include resins such as polyvinylidene fluoride, polypropylene, polyethylene, or polyimide.

The anode active material 32 may be a material which is insoluble in the electrolyte liquid 50.

The lithium secondary battery 10 may include the separator 40. The separator 40 is disposed between the cathode 20 and the anode 30 to prevent direct contact between the cathode 20 and the anode 30. According to the separator 40, the safety of the lithium secondary battery 10 can be sufficiently ensured.

The separator 40 has lithium ionic conductivity. The material of the separator 40 is not particularly limited, as long as the passage of lithium ions is allowed. The separator 40 may be formed of a material which allows the passage of the anode mediator. In this case, since there is a wide choice of the materials of the separator 40, the degree of freedom in designing the lithium secondary battery 10 is increased.

As the material of the separator 40, a material which is not dissolved in the electrolyte liquid 50 can be used. The separator 40 may be composed of at least one selected from the group consisting of a solid electrolyte, a gel electrolyte, an ion exchange resin membrane such as a lithium cation exchange resin, a semipermeable membrane, and a porous membrane. If the separator 40 is formed of these materials, the safety of the lithium secondary battery 10 can be sufficiently ensured. Examples of the solid electrolyte include a sulfide solid electrolyte such as $Li_2S$—$P_2S_5$ and an oxide solid electrolyte such as $Li_7La_3Zr_2O_{12}$ (LLZ). Examples of the gel electrolyte include a gel electrolyte including a fluororesin such as PVdF. Examples of the ion exchange resin membrane include a cation exchange membrane and an anion exchange membrane. Examples of the porous membrane include a porous membrane formed of a polyolefin resin and a porous membrane formed of glass paper provided by weaving glass fibers into a nonwoven fabric.

The separator 40 may cover only a part of the cathode 20 or may cover the whole of the cathode 20. The separator 40 may have a shape of a membrane. If the separator 40 is a porous membrane, examples of the porous membrane include a woven fabric, a nonwoven fabric, a porous membrane formed of a polyolefin resin, and a porous membrane formed of glass paper provided by weaving glass fibers into the nonwoven fabric. These porous membranes exhibit lithium ionic conductivity when impregnated with the electrolyte liquid 50.

Even if the separator 40 is omitted, the lithium secondary battery 10 can be charged and discharged. When the reaction rate between the anode mediator and the anode active material 32 exceeds the reaction rate between the anode mediator and the cathode 20, the lithium secondary battery 10 is charged. The reaction rate between the anode mediator and the cathode 20 decreases, as the concentration of the anode mediator in the electrolyte liquid 50 decreases.

The shortest distance from the anode current collector 31 to the anode active material 32 may be shorter than the shortest distance from the anode current collector 31 to the cathode 20. According to such a configuration, the charge and discharge of the lithium secondary battery 10 can be surely performed.

The electrolyte liquid 50 includes a solvent and an anode mediator. The inside of the container 60 is filled with the electrolyte liquid 50. The solvent may be a non-aqueous solvent.

In the lithium secondary battery 10 of the present embodiment, the electrolyte liquid 50 may include at least one selected from the group consisting of a cyclic ether, a glyme, and a sulfolane. The electrolyte liquid 50 may be an ether solution. Examples of the ether include a cyclic ether and a glycol ether. The glycol ether may be a glyme represented by the composition formula $CH_3(OCH_2CH_2)_nOCH_3$. In the above composition formula, n is an integer of not less than 1. The electrolyte liquid 50 may include, as a solvent, the cyclic ether or a mixture of the cyclic ether and the glyme.

According to the above configuration, an electrolyte liquid including the anode mediator can be realized as the electrolyte liquid 50. In other words, since the solution including the anode mediator is an ether solution having no electron conductivity, the ether solution itself can have a property as an electrolyte liquid.

Examples of the cyclic ether include tetrahydrofuran (THF), 2-methyltetrahydrofuran (2MeTHF), 1,3-dioxolan (1,3DO), and 4-methyl-1,3-dioxolan (4Me1,3DO.

Examples of the glymes include monoglyme (1,2-dimethoxyethane), diglyme (diethylene glycol dimethyl ether), triglyme (triethylene glycol dimethyl ether), tetraglyme (tetraethylene glycol dimethyl ether), pentaethylene glycol dimethyl ether, and polyethylene glycol dimethyl ether. The glyme may be a mixture of tetraglyme and pentaethylene glycol dimethyl ether.

Examples of sulfolane include 3-methylsulfolane.

The electrolyte liquid 50 may include an electrolyte salt. Examples of the electrolyte salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, $LiClO_4$, and a lithium salt such as lithium bis(oxalate) borate. In the electrolyte liquid 50, lithium may be dissolved.

In the lithium secondary battery 10 of the present embodiment, the anode mediator may be present on both the surface of the cathode 20 and the surface of the anode 30. The surface of the anode 30 includes the surface of the anode current collector 31 and the surface of the anode active material 32. Since a dedicated electrolyte is not required for the cathode 20, and there is no need to block the flow of the electrolyte liquid 50 between the cathode 20 and the anode 30, the structure of the lithium secondary battery 10 can be simplified. Even when the separator 40 is used to prevent the contact between the cathode 20 and the anode 30, there are few restrictions imposed on the separator 40.

During the charge of the lithium secondary battery 10 of the present embodiment, the anode mediator may be reduced on the surface of the anode current collector 31.

During the discharge of the lithium secondary battery 10 of the present embodiment, the anode mediator may be oxidized on the surface of the anode current collector 31.

By reducing the anode mediator by the anode current collector 31 during the charge, an amount of the anode mediator oxidized by the anode current collector 31 during the discharge can be increased. Furthermore, by oxidizing the anode mediator by the anode current collector 31 during the discharge, an amount of the anode mediator reduced by the anode current collector 31 during the charge can be increased. In this way, the charge/discharge capacity can be increased.

For example, when the electrolyte liquid 50 is brought into contact with the anode current collector 31, the anode mediator is oxidized or reduced by the anode current collector 31.

For example, when the electrolyte liquid 50 is brought into contact with the anode active material 32, a reduction reaction of the anode mediator by the anode active material 32 occurs, or an oxidation reaction of the anode mediator by the anode active material 32 occurs. The electrolyte liquid 50 may include only the anode mediator as a compound which is oxidized and reduced by the anode active material 32.

The electrolyte liquid 50 does not have to include a compound which provides the electrolyte liquid 50 with an equilibrium potential by dissolving the compound in the solvent of the electrolyte liquid 50 along with lithium, the equilibrium potential being higher than the upper limit potential at which a compound of lithium and the anode active material 32 is formed.

The electrolyte liquid 50 may include, as the anode mediator, only a compound which provides the electrolyte liquid 50 with an equilibrium potential by dissolving the compound in the solvent of the electrolyte liquid 50 along with lithium, the equilibrium potential which is lower than the upper limit potential at which a compound of lithium and the anode active material 32 is formed.

The electrolyte liquid 50 in which the condensed aromatic compound has dissolved has a property of releasing solvated electrons of lithium and dissolving the lithium as cations. In other words, the condensed aromatic compound has a property of receiving, as the solvated electrons, electrons emitted when lithium is dissolved in the solvent of the electrolyte liquid 50 and dissolving in the solvent of the electrolyte liquid 50.

A solution including the condensed aromatic compound has an ability to dissolve lithium. The solution including the condensed aromatic compound may be, for example, an ether solution. Lithium tends to release electrons and be turned into cations. For this reason, lithium releases electrons to the condensed aromatic compound in the solution, and the lithium is turned into cations and dissolved in the solution. At this time, the condensed aromatic compound which has received the electrons is solvated with the electrons. By solvating with the electrons, the condensed aromatic compound behaves as an anion. Therefore, the solution itself including the condensed aromatic compound has ionic conductivity. Here, in the solution including the condensed aromatic compound, the Li cation and the electron are present in an equivalent amount. For this reason, the solution itself including the condensed aromatic compound can have a strong reduction property, in other words, a potential-negative property.

For example, an electrode which is chemically inactive against lithium is immersed in the solvent of the electrolyte liquid 50 in which the condensed aromatic compound has been dissolved and the potential of the electrode with respect to lithium metal is measured. In this way, a considerably negative potential is observed. The observed potential is determined, depending on the degree of the solvation of the condensed aromatic compound and the electrons, namely, the kind of the condensed aromatic compound.

By using an active material having a relatively low equilibrium potential (vs. $Li/Li^+$) as the anode active material 32, a compound having a relatively low equilibrium potential (vs. $Li/Li^+$) can be used as the anode mediator. The active material having a relatively low equilibrium potential as the anode active material 32 is, for example, aluminum. The compound having a relatively low equilibrium potential as the anode mediator is, for example, a condensed aromatic compound. In this way, the anode 30 of the lithium secondary battery 10 having a lower potential can be realized. For this reason, the lithium secondary battery 10 having a high battery voltage can be realized.

If the anode active material 32 includes aluminum, during the charge of the lithium secondary battery 10, the aluminum included in the anode active material 32 reacts with lithium and is reduced to a LiAl alloy. Therefore, if a condensed aromatic compound having a potential which is equal to or lower than the upper limit potential at which the LiAl alloy is formed is used as the anode mediator, a mediator-type anode 30 can be formed. The upper limit potential at which the LiAl alloy is formed is, for example, 0.18 V vs. $Li/Li^+$. The anode mediator is, for example, a compound which provides the electrolyte liquid 50 with an equilibrium potential of not more than 0.18 V vs. $Li/Li^+$ by dissolving the compound in the solvent of the electrolyte liquid 50 along with lithium.

If the anode active material 32 includes tin, during the charge of the lithium secondary battery 10, the tin included in the anode active material 32 reacts with lithium and is reduced to a LiSn alloy. Therefore, if a condensed aromatic compound having a potential which is equal to or lower than the upper limit potential at which the LiSn alloy is formed is used as the anode mediator, a mediator-type anode 30 can be formed. The upper limit potential at which the LiSn alloy is formed is, for example, 0.25 V vs. $Li/Li^+$. The anode mediator is, for example, a compound which provides the electrolyte liquid 50 with an equilibrium potential of not more than 0.25 V vs. $Li/Li^+$ by dissolving the anode mediator in the solvent of the electrolyte liquid 50 along with lithium.

If the anode active material 32 includes graphite, during the charge of the lithium secondary battery 10, the graphite included in the anode active material 32 reacts with lithium and is reduced to $C_6Li$. Therefore, if a condensed aromatic compound having a potential which is equal to or lower than the upper limit potential at which $C_6Li$ is formed is used as the anode mediator, a mediator-type anode 30 can be formed. The upper limit potential at which $C_6Li$ is formed is, for example, 0.15 V vs. $Li/Li^+$. The anode mediator is, for example, a compound which provides the electrolyte liquid 50 with an equilibrium potential of not more than 0.15 V vs. $Li/Li^+$ by dissolving the anode mediator in the solvent of the electrolyte liquid 50 along with lithium.

The above description for aluminum, tin, and graphite also applies to Zn, Si, Ge, Cd, Pb, Bi and Sb. The anode mediator can be appropriately selected, depending on the upper limit potential at which each of LiZn, LiSi, LiGe, LiCd, LiPb, LiBi, and LiSb is formed.

Examples of the condensed aromatic compound which generates a negative potential include phenanthrene, biphenyl, o-terphenyl, triphenylene, acenaphthene, acenaphthylene, fluoranthene, 2,2'-bipyridyl, trans-stilbene, 2,4'-bipyridyl, 2,3'-Bipyridyl, cis-stilbene, propiophenone, butyrophenone, valerophenone, ethylenediamine, benzyl, and tetraphenylcyclopentadienone.

Examples of the condensed aromatic compound having a sufficiently negative potential include phenanthrene, biphenyl, o-terphenyl, triphenylene, acenaphthene, acenaphthylene, fluoranthene and benzyl. In other words, the anode mediator may include at least one kind selected from the group consisting of phenanthrene, biphenyl, o-terphenyl, triphenylene, acenaphthene, acenaphthylene, fluoranthene, and benzyl.

The concentration of the anode mediator in the electrolyte liquid 50 is, for example, not less than 0.00625 mol/L and not more than 0.05 mol/L. If the concentration of the anode mediator is appropriately adjusted, the reaction rate between the charged anode mediator and the cathode 20 can be sufficiently decreased. As a result, the discharge capacity of the lithium secondary battery can be sufficiently ensured. The upper limit of the concentration of the anode mediator in the electrolyte liquid 50 may be 0.025 mol/L, or 0.0125 mol/L.

If lithium is dissolved in an ether solution of the condensed aromatic compound, the potential of the ether solution slightly differs depending on the kind of the solvent. Since the cyclic ether has a low boiling point, the cyclic ether is easily volatilized. Therefore, a mixture of the cyclic ether and a glyme having a relatively high boiling point may be used. In a case where the cyclic ether is used as the solvent for the ether solution, and where THF or 2MeTHF is used as the cyclic ether, the potential of the ether solution tends to be further decreased. In a case where a glyme is used as the solvent for the ether solution, and where triglyme is used as the glyme, the potential of the ether solution is the lowest. Therefore, a mixture of THF or 2MeTHF and triglyme may be used as the solvent for the ether solution. The higher the ratio of the glyme in the solvent of the ether solution is, the higher the potential of the ether solution tends to be. Therefore, the ratio between the volume of the cyclic ether and the volume of the glyme in the solvent of the electrolyte liquid 50 may be from 10:0 to 7:3.

During the charge, the solvated anode mediator is reduced on the anode current collector 31, so that a composite including the solvated electron and Li cations is formed. When the composite is brought into contact with the anode active material 32, the anode active material 32 receives Li cations and solvated electrons, and a compound of lithium and the anode active material 32 is formed. After the composite releases the Li cations and the solvated electrons, the solvated anode mediator is reduced again on the anode current collector 31. Due to this circulation, the anode active material 32 is reduced to the compound of lithium and the anode active material 32, and the solvated anode mediator in the electrolyte liquid 50 is reduced. In this way, the charge of the lithium secondary battery 10 is finished.

During the discharge, first, the reductant of the solvated anode mediator in the electrolyte liquid 50 releases solvated electrons and Li cations on the anode current collector 31. The electrons move to the cathode 20 through an external circuit. The Li cation moves to the cathode 20 through the separator 40. As the discharge proceeds, the concentration of the anode mediator that has released the solvated electrons and the Li cations is increased in the electrolyte liquid 50. In this way, the potential of the electrolyte liquid 50 is increased. When the potential of the electrolyte liquid 50 exceeds the equilibrium potential of the compound of lithium and the anode active material 32, the Li cations and the solvated electrons are supplied to the anode mediator from the compound of the lithium and the anode active material 32, and the composite including the Li cations is formed again. The discharge of the lithium secondary battery 10 is maintained by the composite including the Li cations. When the Li cations and the solvated electrons are released from the compound of the lithium and the anode active material 32, and the composite including the Li cations in the electrolyte liquid 50 releases the Li cations and the solvated electrons, the discharge of the lithium secondary battery 10 is finished.

It has long been known that an alkali metal such as lithium has a property of dissolving in a specific solvent or solution. Examples of such a solvent include amines such as ammonia, methylamine, and ethylamine. In addition, aromatic ketones such as acetophenone or butyrophenone and the solution thereof, and certain aromatic ether solutions also have an ability to dissolve a lithium metal.

In these liquids, a lithium metal releases electrons in a form that the electrons are solvated with the solvent, the electrons being on the 2S orbital thereof and have been owned by the lithium metal itself, and the lithium is dissolved as lithium ions. Electrons solvated with a solvent are referred to as solvated electrons and behave like anions. In the case of a single solvent such as amines, particularly ammonia, solvated electrons are merely formed along with the solvent; however, in the case of the aromatic ketone solution or the certain aromatic ether solution, a complicated configuration in which the solvated electrons have been solvated with solution components is formed, and all of the solution components are required for the dissolution of the lithium metal.

These solvated electrons are in the immediate vicinity of the lithium ions and interact with each other. If the interaction is strong, the solution potential becomes negative, and if the interaction is weak, the solution potential becomes positive. The strength of the interaction is determined depending on the solution (solvent) species and the concentration thereof; however, the solution (solvent) species is very dominant. The interaction is weak for the aromatic ketone solutions, whereas the interaction is very strong for the certain aromatic ether solutions. In addition, in a case of amines, the interaction is intermediate.

The potential can be measured by disposing the above-mentioned solution between a lithium metal and an electrode formed of a stable transition metal (Cu, Fe, or Ni) which does not react with lithium.

Table 1 below shows some potential measurement results of these ether solutions (using 2-methyltetrahydrofuran as ether) provided by actually using copper foil as the transition metal.

TABLE 1

| Classification | Material name | Ability to dissolve Li metal | Potential vs. Li./Li$^+$ | Solvent concentration (M) |
| --- | --- | --- | --- | --- |
| Aromatic | Phenanthrene | Available | 0.03 | 1 |
| Aromatic | Biphenyl | Available | 0 | 1 |
| Aromatic | trans-stilbene | Available | 0.3 | 0.5 |
| Aromatic | 2,2'-bipyridyl | Available | 0.4 | 1 |
| Aromatic | 1,10-phenanthroline | Available | 1.78 | 1 |
| Aromatic | 4,4'-bipyridine | Available | 1.25 | 0.1 |

TABLE 1-continued

| Classification | Material name | Ability to dissolve Li metal | Potential vs. Li/Li+ | Solvent concentration (M) |
|---|---|---|---|---|
| Aromatic | 3,3'-bipyridine | None | 2.5 | 0.1 |
| Aromatic | 2,4'-bipyridine | Available | 0.54 | 0.1 |
| Aromatic | cis-stilbene | Available | 0.43 | 0.1 |
| Aromatic | 2,3'-bipyridine | Available | 0.58 | 0.1 |
| Ketone | Benzophenone | Available | 0.78 | 1 |
| Ketone | Acetophenone | Available | 1.81 | 0.1 |
| Ketone | Propiophenone | Available | 1.55 | 0.1 |
| Ketone | Butyrophenone | Available | 1.57 | 0.1 |
| Ketone | Valerophenone | Available | 1.82 | 0.1 |
| Amine | Ethylenediamine | Available | 1.71 | 0.1 |

In the aromatic ether solution having an ability to dissolve a lithium metal, a lithium metal is not dissolved, in a case where the aromatic compound species is kept as it is, and where a carbonate ester such as vinylene carbonate, ethylene carbonate, propylene carbonate, butylene carbonate, fluoroethylene carbonate, dimethyl carbonate, methyl ethyl carbonate, or diethyl carbonate, or a lactone such as γ-butyrolactone is used in place of the ether. Therefore, such a solution has no potential.

Similarly, in a case where the aromatic compound species is kept as it is, and where a methyl ethyl carbonate is used as the carbonate ester in place of the ether, the ability to dissolve the lithium metal is observed; however, as shown in Table 2, the potential is a high value of not less than 1 V.

TABLE 2

| Material name | Solvent | Electric potential | Solvent concentration (M) |
|---|---|---|---|
| 4'-phenyl acetophenone (4-acetyl biphenyl) | Methylethyl Carbonate | 2 | 0.1 |
| 4'-phenyl butyrophenone (4-butyl biphenyl) | Methylethyl Carbonate | 1.7 | 0.1 |
| 4,4'-di-tert-butyl benzophenone | Methylethyl Carbonate | 1.4 | 0.1 |
| 2,4-dimethyl benzophenone | Methylethyl Carbonate | 1.3 | 0.1 |
| 3,4-dimethyl benzophenone | Methylethyl Carbonate | 1.4 | 0.1 |
| 4,4-dimethyl benzophenone | Methylethyl Carbonate | 1.4 | 0.1 |
| 2-methyl benzophenone | Methylethyl Carbonate | 1.4 | 0.1 |
| 3-methyl benzophenone | Methylethyl Carbonate | 1.5 | 0.1 |
| 4-methyl benzophenone | Methylethyl Carbonate | 1.4 | 0.1 |
| 4-phenyl benzophenone | Methylethyl Carbonate | 1.5 | 0.1 |
| 2-naphthyl phenyl ketone | Methylethyl Carbonate | 1.5 | 0.1 |
| 4,4'-dimethoxy benzyl (P-anisyl) | Methylethyl Carbonate | 2 | 0.1 |
| 4,4'-dimethyl benzyl | Methylethyl Carbonate | 2.1 | 0.1 |
| 2,4'-dimethoxy benzophenone | Methylethyl Carbonate | 1.5 | 0.1 |

If the potential of the lithium metal solution is negative, especially if the potential of the lithium metal solution is sufficiently more negative than the equilibrium potential of the anode active material, the anode active material can be lithiated, namely, charged by immersing the anode active material in the lithium metal solution.

However, since the equilibrium potential of the anode active material differs depending on the anode active material species, it is necessary to select a suitable potential of the lithium metal solution according to the anode active material species, namely, select a component of the aromatic ether solution.

Table 3 shows results provided by measuring, in the same manner as in Table 1, the potentials of various aromatic compounds in 2-methyltetrahydrofuran solutions in which a lithium metal has been dissolved.

TABLE 3

| Material name | Solvent | Electric potential vs Li/Li+ | Solvent concentration (M) |
|---|---|---|---|
| Phenanthrene | 2-methyltetrahydrofuran | 0.03 | 1 |
| Biphenyl | 2-methyltetrahydrofuran | 0 | 1 |
| Triphenylene | 2-methyltetrahydrofuran | 0.01 | 0.1 |
| Acenaphthene | 2-methyltetrahydrofuran | 0.02 | 0.1 |
| Acenaphthylene | 2-methyltetrahydrofuran | 0.01 | 0.1 |
| Fluoranthene | 2-methyltetrahydrofuran | 0.01 | 0.1 |
| Benzyl | 2-methyltetrahydrofuran | 0.16 | 0.1 |
| trans-stilbene | 2-methyltetrahydrofuran | 0.3 | 0.5 |
| cis-stilbene | 2-methyltetrahydrofuran | 0.43 | 0.1 |
| 2, 2-bipyridyl | 2-methyltetrahydrofuran | 0.4 | 1 |
| 2-methyl biphenyl | 2-methyltetrahydrofuran | 0 | 0.1 |
| 3-methyl biphenyl | 2-methyltetrahydrofuran | 0 | 0.1 |
| 4-methyl biphenyl | 2-methyltetrahydrofuran | 0 | 0.1 |
| 3,3-dimethyl biphenyl | 2-methyltetrahydrofuran | 0 | 0.1 |
| Biphenyl | triglyme | 0.08 | 0.1 |
| Biphenyl | 2,5-dimethyl tetrahydrofuran | 0.18 | 0.1 |
| Biphenyl | Diethyleneglycoldimethylether | 0.18 | 0.1 |
| Biphenyl | Dibutoxyethane | 0.05 | 0.1 |
| Biphenyl | Diglyme | 0.15 | 0.1 |
| Biphenyl | Tetraglyme | 0.18 | 0.1 |
| Biphenyl | 1,3-dioxolane | 0.55 | 0.1 |
| Benzophenone | Ethyl isopropyl sulfone | 1.55 | 0.1 |
| Triphenyl amine | Tetraglyme | 1.5 | 0.1 |
| Biphenyl | 3-methyl sulfolane | 0.43 | 1 |

When electrolytic reduction is performed in these solutions, a lithium metal is produced, and is dissolved at the same time as the production thereof, thereby producing a lithium metal solution.

By the way, bismuth, tin, germanium, aluminum, silicon, zinc, and cadmium are metals capable of forming an alloy with lithium; however, the equilibrium potentials when the alloys are formed with lithium are different from each other. Table 4 shows these equilibrium potentials.

TABLE 4

| Material name | Equilibrium potential (V vs. Li/Li+) |
|---|---|
| Bismuth | 1 |
| Tin | 0.6 |
| Germanium | 0.5 |
| Aluminum | 0.4 |
| Silicon | 0.3 |
| Zinc | 0.2 |
| Cadmium | 0.1 |

For example, to use an alloy metal having a negative potential such as zinc or cadmium, a lithium metal solution having a potential of less than 0.1 V is required. Examples of such a lithium metal solution include a 2-methyltetrahydrofuran solution of phenanthrene, biphenyl, triphenyl, acenaphthene, acenaphthyl, or fluoranthene, a dibutoxyethane solution of biphenyl, and a triglyme solution of biphenyl.

To use aluminum or silicon, a lithium metal solution having a potential of less than 0.1 V is required. Examples of the lithium metal solution include a diglyme solution of biphenyl and a tetraglyme solution of biphenyl in addition to the above solutions.

In a case where the metal capable of forming an alloy with lithium are immersed in the lithium metal solution, and where the potential of the lithium metal solution is sufficiently negative with respect to the equilibrium potential of the metal capable of forming an alloy with lithium, the alloying reaction of lithium proceeds, and lithium in the lithium metal solution is absorbed in the alloy metal.

Therefore, similarly to the case where the metal capable of forming an alloy with lithium is present in the lithium metal solution generated by electrolytic reduction, the alloying reaction of lithium proceeds, and lithium in the lithium metal solution is absorbed in the alloy metal.

If electrolytic reduction is performed continuously, the reaction in which the lithium metal solution is electrochemically generated by the electrolytic reduction and the reaction in which lithium in the lithium metal solution is chemically absorbed in the alloy metal reach an equilibrium, and the reaction proceeds at a constant potential of the lithium metal solution. Since lithiation of the alloy metal occurs chemically, the alloy metal only needs to be in contact with (immersed in) the lithium metal solution, and does not have to be in contact with the electrode, unlike a conventional lithium alloy anode active material.

When the alloy metal absorbs lithium up to the saturated composition, the alloy metal becomes fully charged. When the charge (electrolytic reduction) is further continued, the solution absorbs lithium up to the saturation concentration of the lithium metal solution; however, when the concentration of the lithium exceeds the saturation concentration, a lithium metal is deposited on the electrode, and the battery is fully charged at this time. The charge capacity of the anode is the sum of the charge capacity of the alloy metal and the charge capacity of the lithium metal solution, and the charge capacity is increased as compared to a conventional battery simply using the alloy metal as the anode. Note that the charge capacity of the alloy metal is much larger than the charge capacity of the lithium metal solution.

The potential of the lithium metal solution is determined from the activity of the solvated electrons on the basis of the Nernst equation. When the discharge (electrolytic oxidation) is performed, the activity of the solvated electrons decreases, so that the potential shifts in the positive direction. When the potential exceeds the equilibrium potential of the lithium alloy, the lithium metal solution is chemically reduced by the lithium alloy, and the potential of the lithium metal solution shifts to the negative direction, so that the lithium alloy is oxidized. By this repetition, lithium is released from the alloy metal, and the alloy metal is oxidized.

When the alloy metal releases lithium completely, the alloy metal reaches a completely discharged state. When the discharge (electrolytic oxidation) is further continued, the discharge continues until the lithium metal solution completely releases lithium. The discharge capacity of the anode is the sum of the discharge capacity of the alloy metal and the discharge capacity of the lithium metal solution, and the discharge capacity is increased as compared to the conventional battery using the alloy metal as the anode. Note that the discharge capacity of the alloy metal is much larger than the discharge capacity of the lithium metal solution.

As is clear from the above, in the configuration of the present disclosure, the charge and discharge of the alloy metal is performed via the lithium metal solution. In the conventional lithium alloy anode active material, since expansion and contraction occur during charge and discharge respectively, the contact of the electrode (current collector) fails to be formed during the discharge, which causes failure of the discharge; however, by employing the configuration of the present disclosure, the alloy metal can be charged and discharged, even without the contact with the electrode (current collector). In other words, it is possible to overcome a critical defect of the alloy anode, namely, a decrease in current collection due to the volume expansion and contraction due to the charge and discharge.

In case where the solvated electrons in the lithium metal solution are brought into contact with the cathode, a short circuit occurs and self-discharge occurs. If the self-discharge speed is high, the self-discharge occurs concurrently with the charge, and substantially no charge is possible. In the case, of course, discharge cannot be performed. The self-discharge speed depends on the concentration of the solvated electrons, and if the concentration is very low, the self-discharge speed is made slow.

The concentration of the solvated electron is determined depending on the concentration of a substance selected from the group consisting of phenanthrene, biphenyl, triphenylene, acenaphthene, acenaphthylene, fluoranthene, and benzyl. Therefore, by decreasing the concentration of these substances, the self-discharge speed can be decreased and charge/discharge can be performed. For this purpose, the concentration of these substances has to be not less than 0.00625 mol/L and not more than 0.05 mol/L.

In the lithium secondary battery of the present disclosure, even if the anode active material (alloying material) is pulverized, charge and discharge can be performed, and reversibility which is not satisfactorily provided in a case of using the alloy anode is realized.

The charge/discharge process of the lithium secondary battery 10 of the present embodiment will be described.

In the present operation example, the anode current collector 31 is formed of stainless steel. The electrolyte liquid 50 is an ether solution in which the anode mediator has been dissolved. The anode mediator is one kind of condensed aromatic compound (hereinafter, referred to as Md). The anode active material 32 is aluminum. The cathode 20 comprises the cathode current collector 21 formed of stainless steel, and the cathode active material layer 22 including lithium iron phosphate (LiFePO$_4$) as a cathode active material.

[Description of Charge Process]

First, the charge reaction will be described.

The charge is performed by applying a voltage between the cathode current collector 21 and the anode current collector 31.

(Reaction on Cathode)

The oxidation reaction of the cathode active material occurs in the cathode 20 by applying the voltage. In other words, lithium ions are released from the cathode active material. As a result, electrons are emitted from the cathode 20 to the outside of the lithium secondary battery 10.

For example, in the present operation example, the following reaction occurs.

$$LiFePO_4 \rightarrow FePO_4 + Li^+ + e^-$$

A part of the generated lithium ions (Li$^+$) moves toward the anode 30 through the separator 40.

(Reaction on Anode)

Electrons are supplied to the anode current collector 31 from outside the lithium secondary battery 10 by applying the voltage. As a result, a reduction reaction of the anode mediator occurs on the anode current collector 31.

For example, in the present operation example, the following reaction occurs.

$$Md + Li^+ + e^- \rightarrow Md.Li$$

The reduced anode mediator is oxidized by the anode active material 32. In other words, the anode active material 32 is reduced by the anode mediator. As a result, the anode active material 32 reacts with lithium to be LiAl.

For example, in the present operation example, the following reaction occurs.

$$Al + Md.Li \rightarrow LiAl + Md$$

As described above, the anode mediator has not changed in view of the total reaction.

On the other hand, the anode active material 32 located at a location apart from the anode current collector 31 is in a charged state.

The charge reaction described above can proceed, until the anode active material 32 reaches a charged state or the cathode active material reaches a charged state.

[Description of Discharge Process]

Next, a discharge reaction from full charge will be described.

At the full charge, the anode active material 32 and the cathode active material are in a charged state.

In the discharge reaction, electric power is taken out from between the cathode current collector 21 and the anode current collector 31.

(Reaction on Cathode)

By discharging the lithium secondary battery 10, electrons are supplied to the cathode 20 from outside the lithium secondary battery 10. As a result, in the cathode 20, a reduction reaction of the cathode active material occurs.

For example, in the present operation example, the following reaction occurs.

$$FePO_4 + Li^+ + e^- \rightarrow LiFePO_4$$

A part of the lithium ions ($Li^+$) moves toward the cathode 20 through the separator 40.

(Reaction on Anode)

By discharging the lithium secondary battery 10, an oxidation reaction of the anode mediator occurs on the anode current collector 31. As a result, electrons are emitted from the anode current collector 31 to the outside of the lithium secondary battery 10.

For example, in the present operation example, the following reaction occurs.

$$Md.Li \rightarrow Md + Li^+ + e^-$$

The oxidized anode mediator is reduced by the anode active material 32. In other words, the anode active material 32 is oxidized by the anode mediator. As a result, the anode active material 32 releases lithium.

For example, in the present operation example, the following reaction occurs.

$$LiAl + Md \rightarrow Al + Md.Li$$

As described above, the anode mediator has not changed in view of the total reaction.

On the other hand, the anode active material 32 located at a location apart from the anode current collector 31 is in a discharged state.

The above discharge reaction can proceed, until the anode active material 32 reaches a discharged state or the cathode active material reaches a discharged state.

Figure 4A:
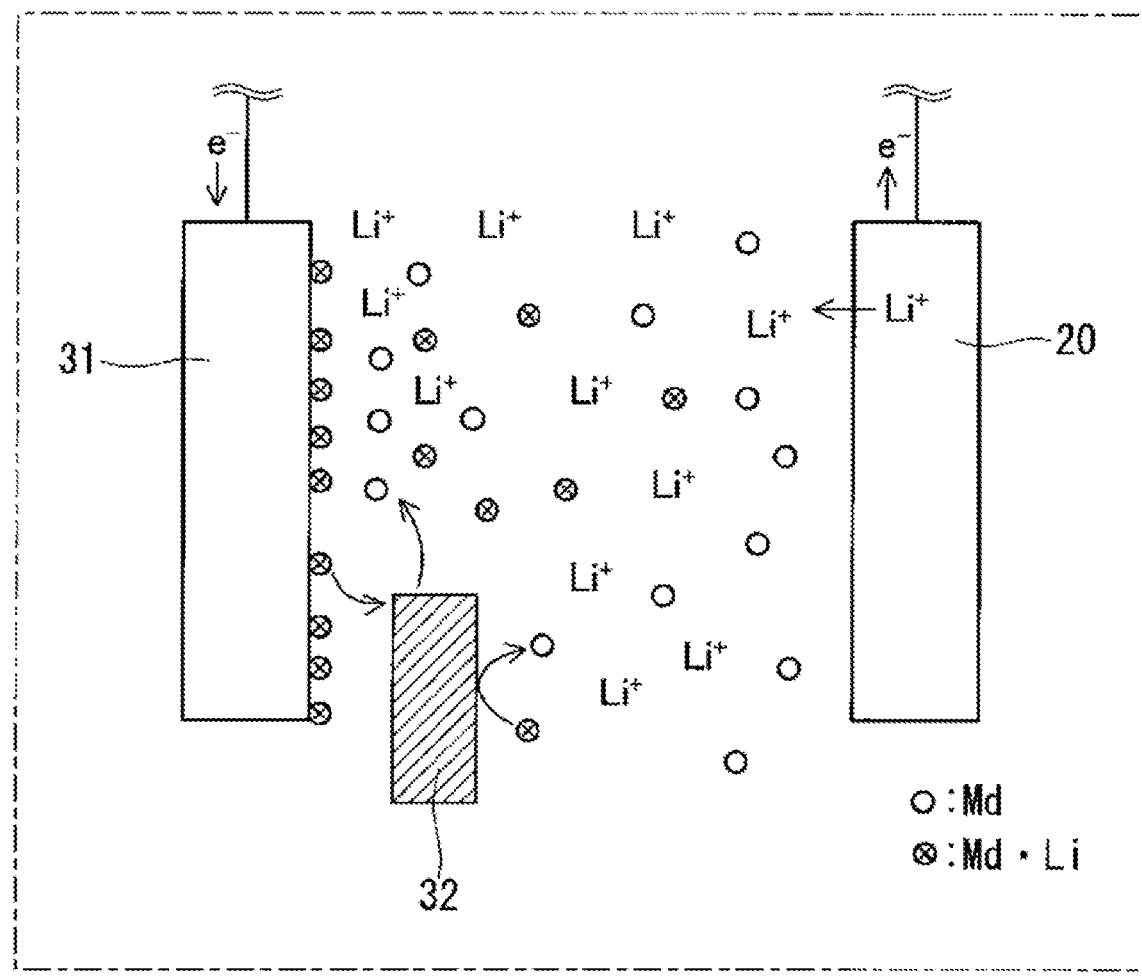
FIG. 4A is a schematic diagram showing a state of the electrolyte liquid during charge.

FIG. 4A shows the state of the electrolyte liquid 50 during the charge. In the lithium secondary battery 10 of the present embodiment, the electrolyte liquid 50 including the anode mediator is in contact with both the cathode 20 and the anode 30. The anode mediator receives electrons on the anode current collector 31. A composite of the anode mediator and the Li cation is formed on the anode current collector 31. When the composite of the anode mediator and the Li cation is brought into contact with the anode active material 32, the Li cation and the electron are supplied from the composite to the anode active material 32.

Figure 4B:
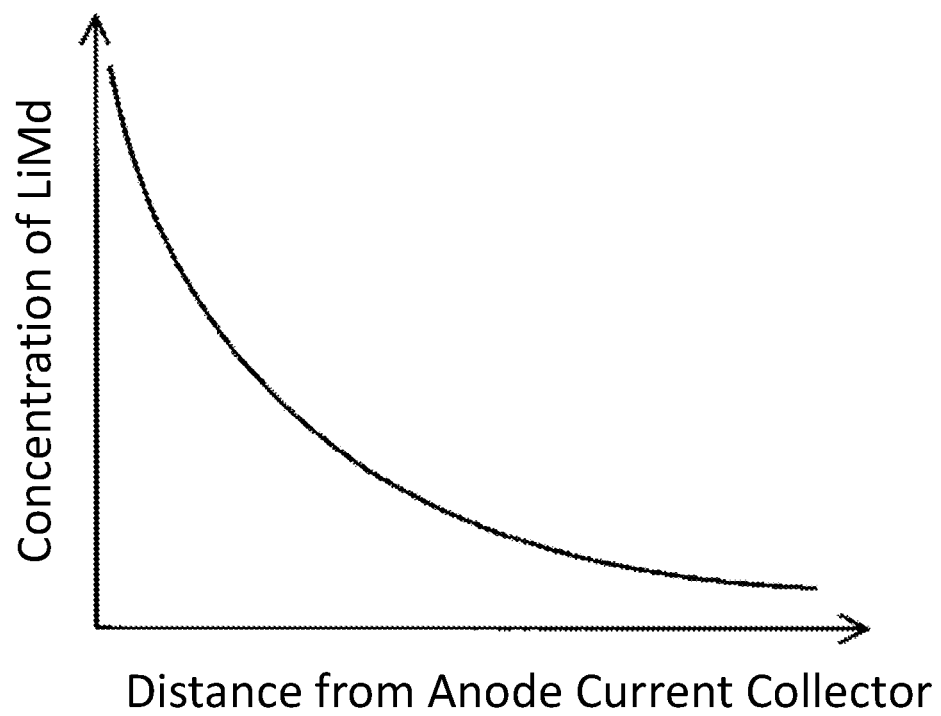
FIG. 4B is a graph showing a relationship between a distance from an anode current collector and a concentration of a composite (Md.Li).

Since the composite of the anode mediator and the Li cation diffuses in the electrolyte liquid 50, the composite is also present on the surface of the cathode 20. As shown in FIG. 4B, the concentration of the composite (Md.Li) decreases depending on the distance from the anode current collector. If the concentration of the composite (Md.Li) on the surface of the cathode 20 is sufficiently low, the charge and discharge of the lithium secondary battery 10 of the present embodiment can be repeatedly performed.

EXAMPLES

The present disclosure will be specifically described on the basis of examples. Note that the present disclosure is not limited at all by the following examples.

Inventive Example 1

Figure 2:
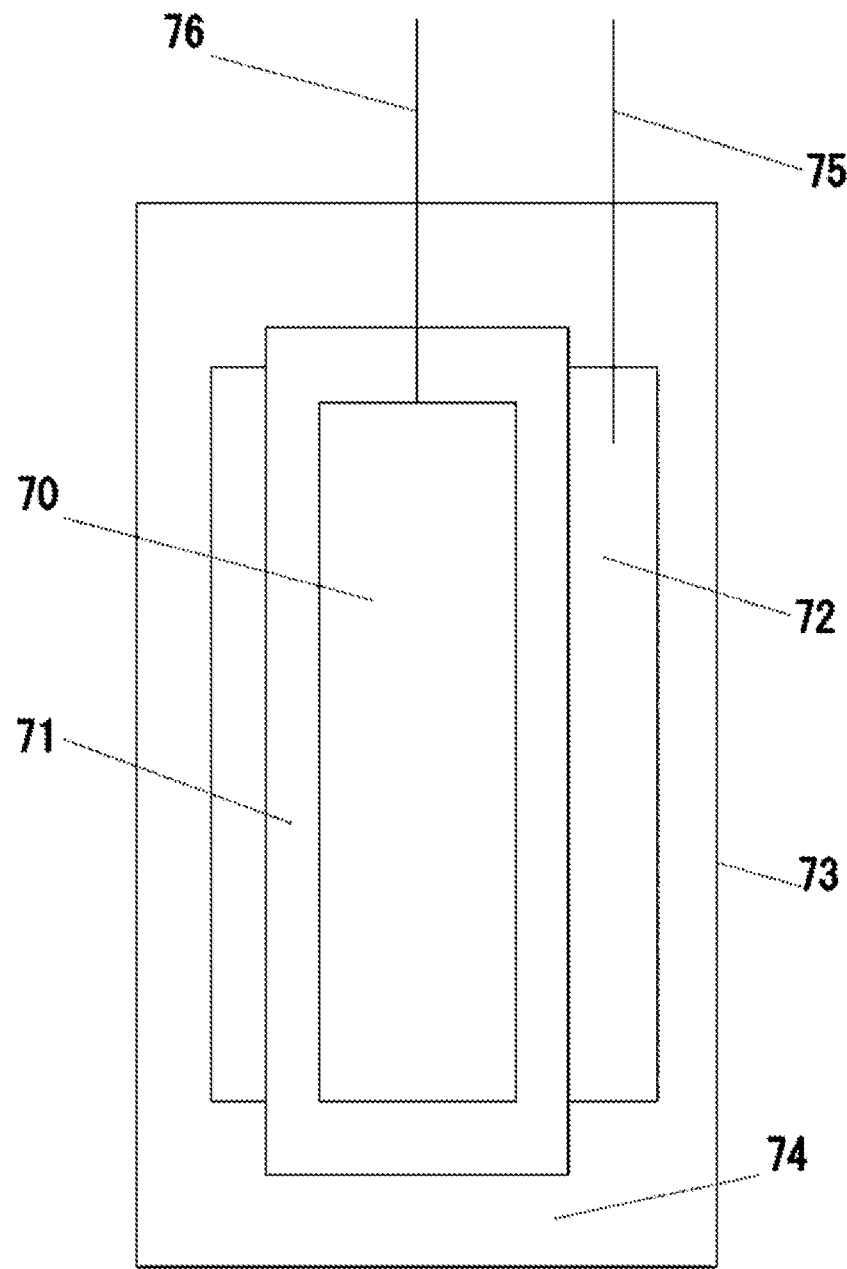
FIG. 2 is a schematic cross-sectional view of a potential measurement cell according to the examples of the present disclosure.

Copper foil 70 of 2 cm×2 cm was wrapped with a polypropylene microporous separator 71, and the whole of the polypropylene microporous separator 71 was wrapped with a large amount of lithium metal foil 72. Next, tabs were attached to the copper foil and the lithium metal to form an electrode group. Subsequently, the lithium metal foil 72 was stored in a laminate outer package 73, and an ether solution 74 in which biphenyl was dissolved at a concentration of 0.1 mol/L was injected. Then, an opening of the laminate outer package 73 was sealed hermetically by thermal fusion to produce a potential measurement cell shown in FIG. 2.

The solvent of the ether solution included 2-methyltetrahydrofuran as a cyclic ether and triglyme as a glyme. The ratio of the volume of the triglyme to the volume of the solvent in the ether solution was 0.2. In other words, the ratio between the volume of the 2-methyltetrahydrofuran and the volume of the triglyme was 8:2. In the ether solution, 1 mol/L of $LiPF_6$ was dissolved as a supporting salt. Thus, the potential measurement cell 1 was produced.

Figure 3:
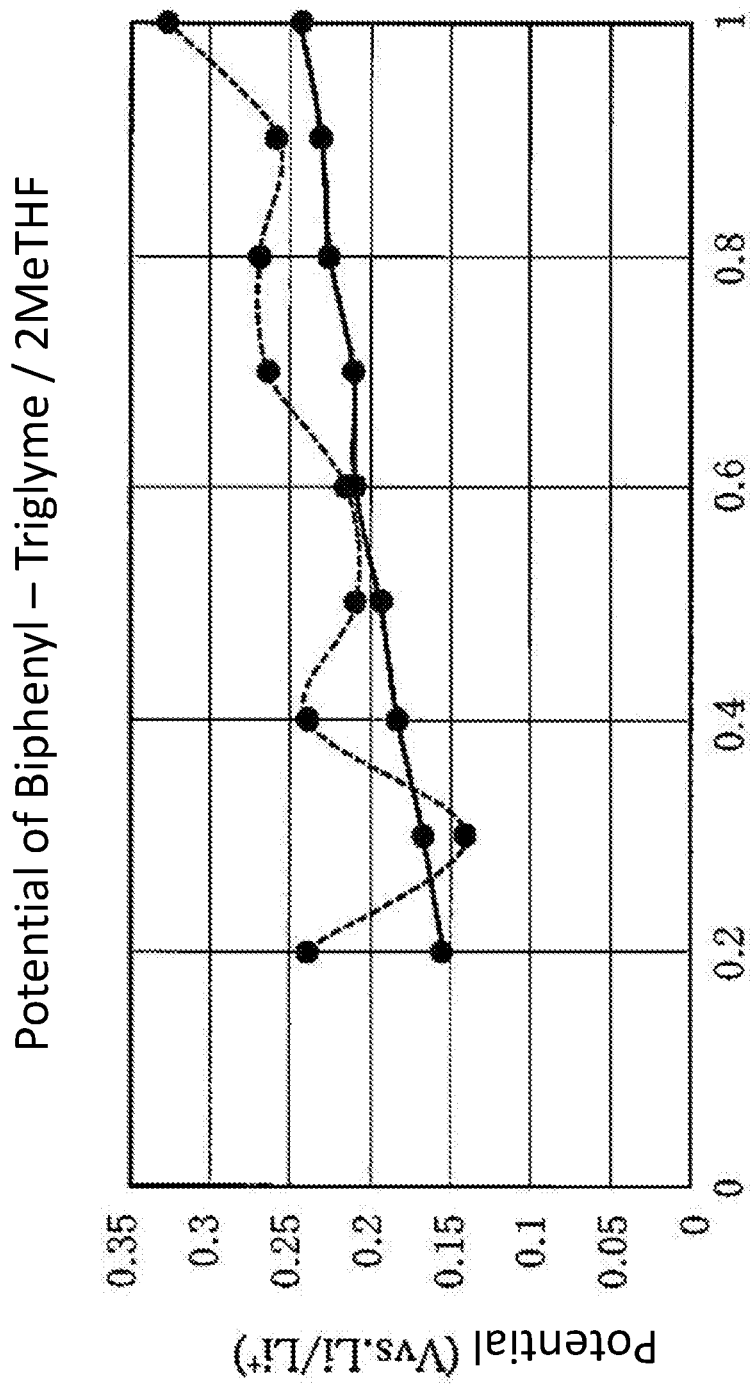
FIG. 3 is a graph showing a relationship between a ratio of a volume of triglyme to a volume of a solvent in an electrolyte liquid and values of potentials of the potential measurement cells in the potential measurement cells 1 to 9.

FIG. 3 shows the potential (V vs. Li/Li$^+$) measured on the basis of a lithium metal using the potential measurement cell. The value of the potential immediately after the production of the potential measurement cell was approximately 0.24 V vs. Li/Li$^+$. The value of the potential 100 hours after the production of the potential measurement cell was approximately 0.15 V vs. Li/Li$^+$.

Next, potential measurement cells 2 to 9 were prepared in the same manner as above, except that the ratio of the volume of the triglyme to the volume of the solvent in the ether solution was changed. In the potential measurement cells 2 to 9, the ratio of the volume of the triglyme to the volume of the solvent in the ether solution was 0.3, 0.4, 0.5, 0.6, 0.7, 0.8, 0.9, and 1.0, respectively. For these potential measurement cells, the values of the potential immediately after the production of the potential measurement cells and the values of the potential 100 hours after the production of the potential measurement cells were measured. FIG. 3 shows the relationship between the ratio of the volume of the triglyme to the volume of the solvent in the ether solution and the values of the potential of the potential measurement cells. In FIG. 3, the broken line indicates the values of the potential immediately after the production of the potential measurement cells. The solid line indicates the values of the potential 100 hours after the production of the potential measurement cells.

Next, aluminum was added to each of the ether solutions of the potential measurement cells 1 to 9. After 100 hours elapsed from the addition of the aluminum, the surface of the aluminum was observed. As a result, the present inventors observed that the aluminum added to the potential measurement cell 1 in which the ratio between the volume of the 2-methyltetrahydrofuran and the volume of the triglyme was 8:2 and the aluminum added to the potential measurement cell 2 in which the ratio between the volume of the 2-methyltetrahydrofuran and the volume of the triglyme was 7:3 were turned into LiAl alloys in a powder form. The present inventors observed that only the surface of the aluminum added to the potential measurement cell 3 in which the ratio between the volume of the 2-methyltetrahydrofuran and the volume of the triglyme was 6:4 was rough and that a part of the surface was turned into a LiAl alloy. The shape of the aluminum when the aluminum was added to the ether solution was maintained. The present inventors observed neither change of the aluminum added to the potential measurement cells 4 to 9 in which the ratio between the volume of the 2-methyltetrahydrofuran and the volume of the triglyme was 5:5 to 0:10 nor the formation of the LiAl alloy. From the above results, it can be seen that, if the potential of the ether solution was not more than 0.18 V vs. Li/Li$^+$, a LiAl alloy is formed. Such an ether solution can be used as a solvent of an electrolyte liquid of a lithium secondary battery.

Inventive Example 2

LiFePO$_4$ equivalent to 8 mAh as a cathode active material, Al foil equivalent to 2 mAh as an anode active material, surface-roughened copper foil as an anode current collector, and a 2-methyltetrahydrofuran solution including a lithium salt and biphenyl as an electrolyte liquid were prepared. Using these, the lithium secondary battery shown in FIG. 1 was produced. The cathode was wrapped with a separator formed of a microporous membrane. LiPF$_6$ was used as a lithium salt. The concentration of LiPF$_6$ in the electrolyte liquid was 1 mol/L. The concentration of the biphenyl in the electrolyte liquid was adjusted to 0.00625 mol/L, 0.0125 mol/L, 0.025 mol/L, or 0.05 mol/L to provide four lithium secondary batteries.

A charge/discharge test of the provided lithium secondary batteries was performed. The charge/discharge test was performed under the conditions of a charge/discharge current of 1 mA, a charge time of 2 hours, and a discharge cutoff voltage of 2 V. The results are shown in FIG. 5.

Figure 5:
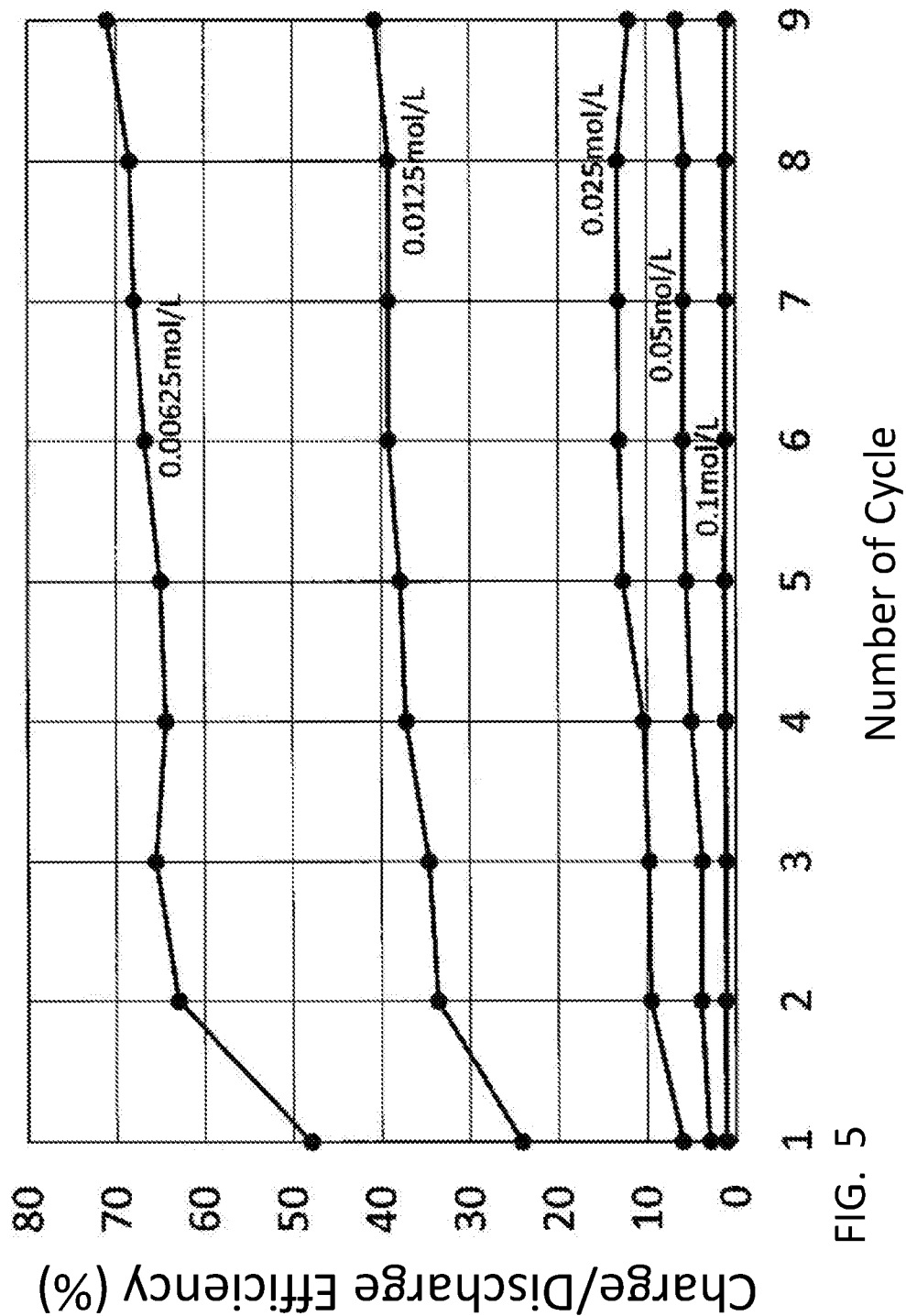
FIG. 5 is a graph showing a cycle characteristic of the lithium secondary battery of the inventive example 2.

The vertical axis in FIG. 5 indicates the charge/discharge efficiency (unit:%). The charge/discharge efficiency is a ratio (%) of the discharge capacity in each cycle to the initial charge capacity (2 mAh). As shown in FIG. 5, the cycle characteristic was changed depending on the concentration of the biphenyl in the electrolyte liquid.

As the concentration of the biphenyl was decreased, the charge/discharge efficiency was improved. The charge capacity was 2 mAh, which was much larger than the capacity of biphenyl. This means that Al forms a LiAl alloy and participates in the charge and discharge. It is conceivable that Al was turned into the LiAl alloy and that the LiAl alloy was pulverized; however, discharge was possible due to the action of the solvated electrons formed of the biphenyl.

The reason for the low charge/discharge efficiency at the initial period of the charge/discharge cycle is that the solvated electrons formed of the charged biphenyl was brought into contact with the cathode to cause a short circuit to occur. After a plurality of the charge/discharge cycles are performed, Al is pulverized and the surface area thereof increases, so that the reaction rate between the solvated electrons formed of the charged biphenyl and Al is increased, and the reaction rate exceeds the rate of the chemical short circuit between the solvated electron formed of the charged biphenyl and the cathode. As a result, the charge/discharge efficiency is gradually increased.

Since the chemical short circuit between the solvated electron formed of the charged biphenyl and the cathode was not zero, the charge/discharge efficiency did not reach 100%, even if the charge/discharge cycles were repeated.

In the lithium secondary battery, lithium included in the cathode moves between the cathode and the anode. If lithium is inactivated in the process, the charge capacity is decreased and cannot be restored. In the conventional lithium secondary battery using the alloying material, loss of electrical contact between the alloying material and the anode current collector would also be one kind of the inactivation.

In the lithium secondary battery of the present embodiment, even if the chemical short circuit occurs, lithium returns to the cathode without being inactivated, and thus the charge capacity of the lithium secondary battery is restored. Therefore, the charge and discharge can be repeated, even if the charge/discharge efficiency does not reach 100%.

FIG. 5 shows the results when biphenyl and 2-methyltetrahydrofuran were used as the substance having an ability to form solvated electrons. It is conceivable that the results are hardly influenced by the kind of the substance having an ability to form solvated electrons. This is because the reaction rate depends on the concentration of the substance having an ability to form solvated electrons in the electrolyte liquid.

Inventive Example 3

LiFePO$_4$ equivalent to 3.9 mAh as a cathode active material, Si equivalent to 0.75 mAh as an anode active material (Si deposited on Cu foil by a sputtering method), and surface-roughened copper foil as an anode current collector, and a 2-methyltetrahydrofuran solution including a lithium salt and biphenyl as an electrolyte liquid were prepared. The 2-methyltetrahydrofuran solution including the biphenyl acts as the substance having an ability to form solvated electrons. Using these, a lithium secondary battery was produced. The cathode was wrapped with a separator formed of a microporous membrane. LiPF$_6$ was used as a lithium salt. The concentration of LiPF$_6$ in the electrolyte liquid was 1 mol/L. Lithium secondary batteries in which the concentration of the biphenyl in the electrolyte liquid was adjusted to 0.0015625 mol/L, 0.00625 mol/L, 0.0125 mol/L, and 0.025 mol/L were provided.

Figure 6:
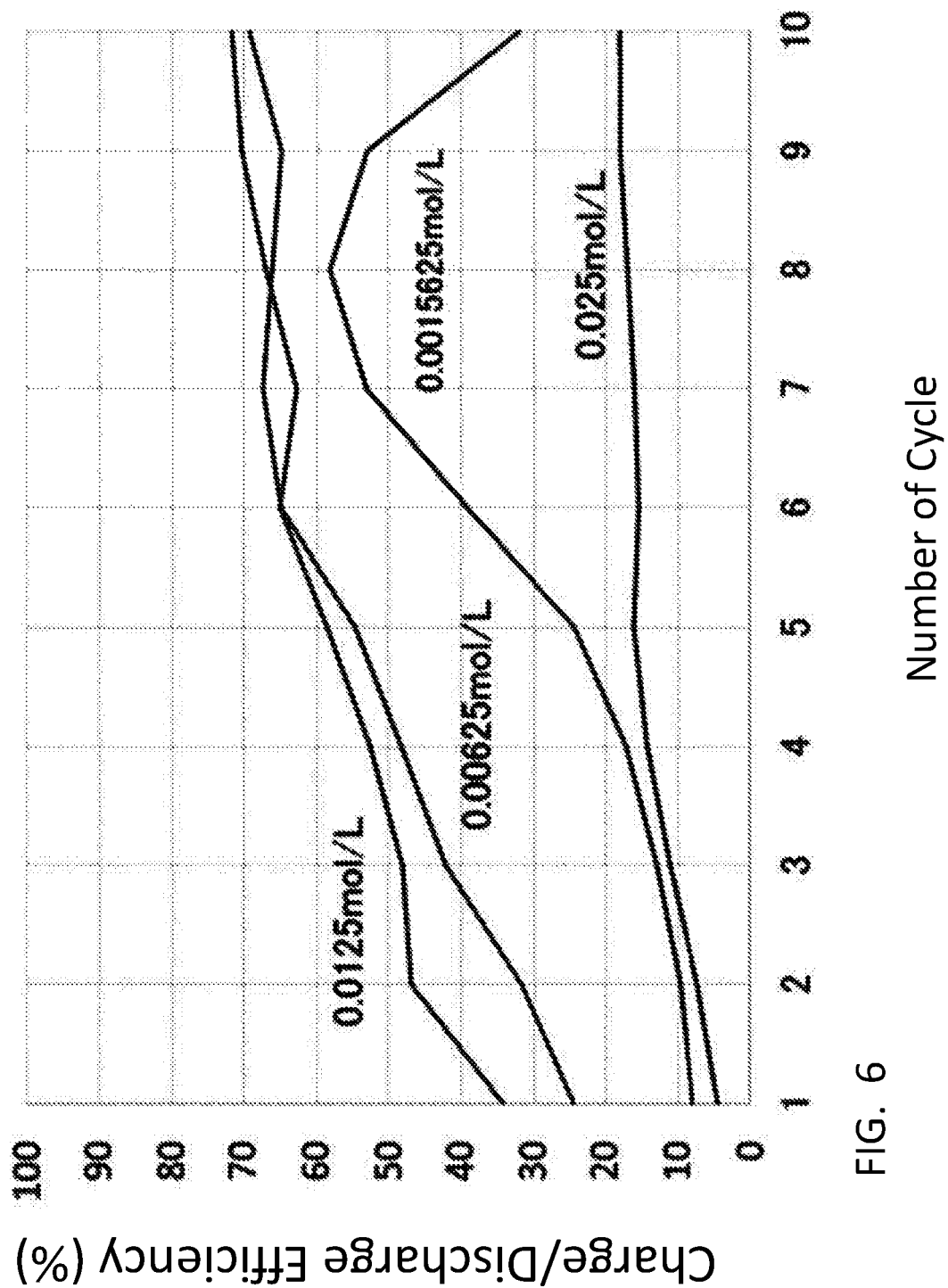
FIG. 6 is a graph showing the cycle characteristic of the lithium secondary battery of the inventive example 3.

The charge/discharge test of the provided lithium secondary batteries was performed. The charge/discharge test was performed under the conditions of a charge/discharge current of 0.74 mA, a charge time of 1 hour, and a discharge cutoff voltage of 2.0 V. FIG. 6 shows the results.

The vertical axis in FIG. 6 indicates the charge/discharge efficiency (unit:%). The charge/discharge efficiency is the ratio of the discharge capacity in each cycle to the initial charge capacity (0.74 mAh). The initial charge capacity was 0.74 mAh, which was much larger than the capacity of biphenyl. This means that Si forms a LiSi alloy and participates in the charge and discharge. It is conceivable that Si was turned into the LiSi alloy and that the LiSi alloy was pulverized, however, discharge was possible due to the action of the biphenyl.

Inventive Example 4

$LiFePO_4$ equivalent to 7.8 mAh as a cathode active material, and Si equivalent to 1.5 mAh (Si deposited on Cu foil by a sputtering method) as an anode active material were prepared, and other conditions were the same as those of the inventive example 1. The concentration of the biphenyl in the electrolyte liquid was adjusted to 0.00625 mol/L and 0.0125 mol/L to provide lithium secondary batteries.

Figure 7:
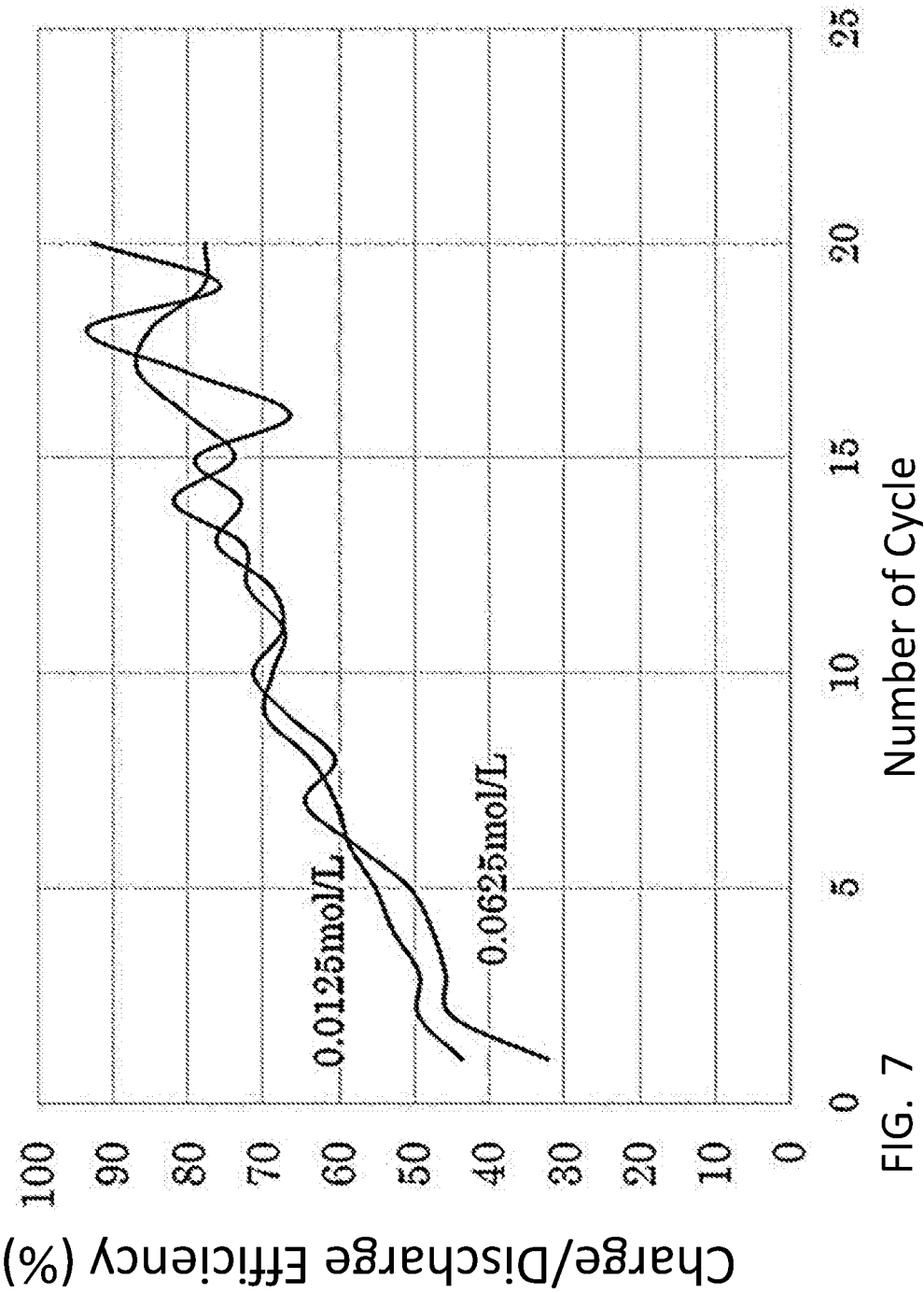
FIG. 7 is a graph showing the cycle characteristic of the lithium secondary battery of the inventive example 4.

The charge/discharge test of the provided lithium secondary batteries was performed. The charge/discharge test was performed under the conditions of a charge/discharge current of 1.5 mA, a charge time of 1 hour, and a discharge cutoff voltage of 2.0 V. FIG. 7 shows the results.

The vertical axis in FIG. 7 indicates the charge/discharge efficiency (unit:%). The charge/discharge efficiency is the ratio of the discharge capacity in each cycle to the initial charge capacity (1.5 mAh). The initial charge capacity was 1.5 mAh, which was much larger than the capacity of biphenyl. This means that Si forms a LiSi alloy and participates in the charge and discharge. It is conceivable that Si was turned into the LiSi alloy and that the LiSi alloy was pulverized, however, the discharge was possible due to the action of biphenyl.

Inventive Example 5

$LiFePO_4$ equivalent to 7.2 mAh as a cathode active material and Zn foil equivalent to 2 mAh as an anode active material were prepared, and other conditions were the same as those of the inventive example 4. A lithium secondary battery in which the concentration of biphenyl in the electrolyte liquid was adjusted to 0.00625 mol/L was provided.

Figure 8:
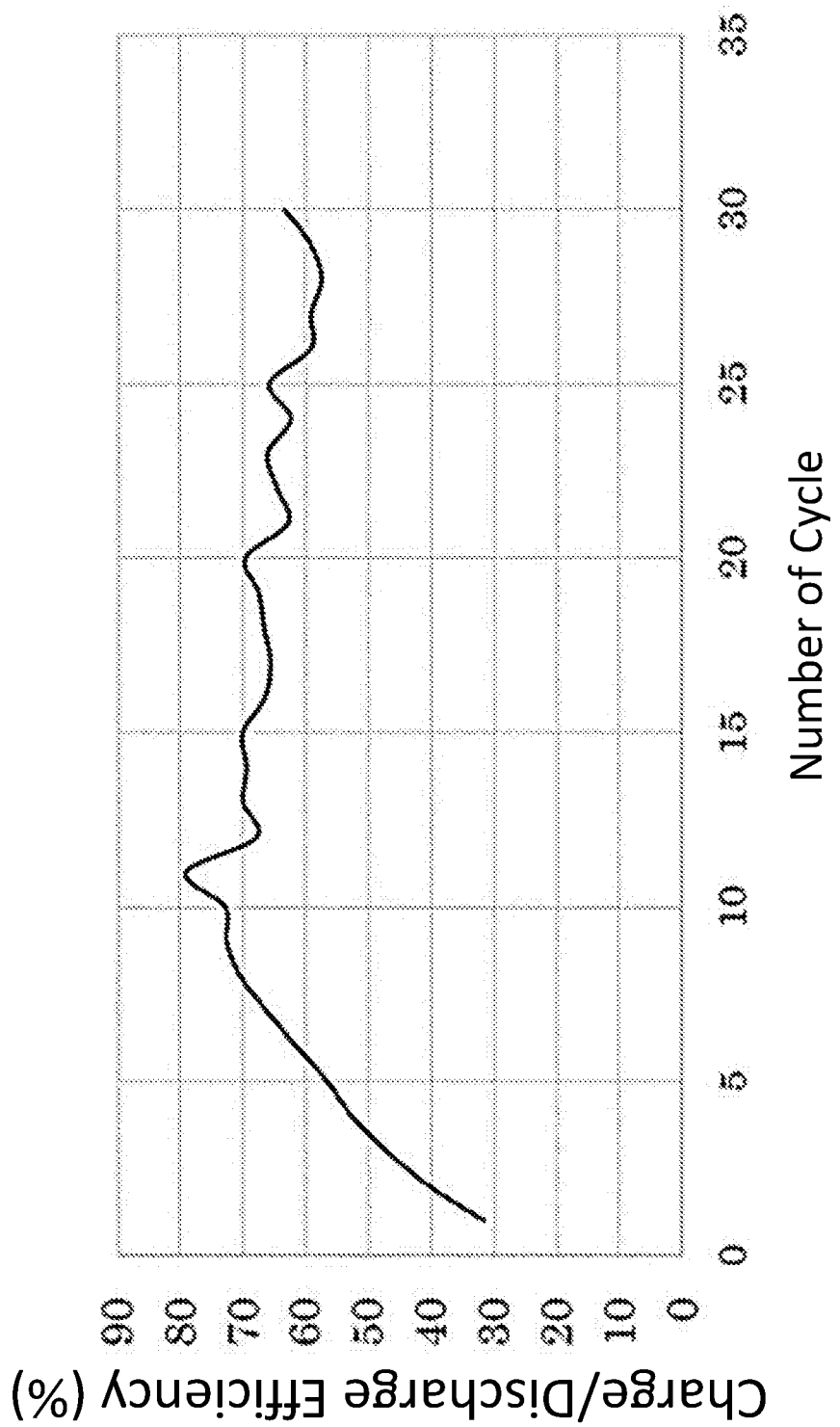
FIG. 8 is a graph showing the cycle characteristic of the lithium secondary battery of the inventive example 5.

The charge/discharge test of the provided lithium secondary battery was performed. The charge/discharge test was performed under the conditions of a charge/discharge current of 1 mA, a charge time of 2 hours, and a discharge cutoff voltage of 1.5 V. FIG. 8 shows the results.

The vertical axis in FIG. 8 indicates the charge/discharge efficiency (unit:%). The charge/discharge efficiency is a ratio of the discharge capacity in each cycle to the initial charge capacity (2 mAh). The initial charge capacity was 2 mAh, which was much larger than the capacity of biphenyl. This means that Zn forms a LiZn alloy and participates in the charge and discharge. It is conceivable that Zn was turned into the LiZn alloy and that the LiZn alloy was pulverized, however, the discharge was possible due to the action of biphenyl.

Comparative Example 1

A lithium secondary battery was produced in the same manner as in the inventive example 2, except that biphenyl was not included in the electrolyte liquid and that aluminum foil which doubled as the anode active material was used as the anode current collector. The lithium secondary battery of the comparative example was chargeable, but not dischargeable. This is probably because the aluminum of the anode was pulverized to make it difficult to collect electrons.

Comparative Example 2

A lithium secondary battery was produced in the same manner as in the inventive example 2, except that biphenyl was not included in the electrolyte liquid, and that a Si wafer which doubled as the anode active material was used as the anode current collector. The lithium secondary battery of the comparative example was chargeable, but not dischargeable. This is probably because the Si wafer of the anode was pulverized to make it difficult to collect electrons.

Comparative Example 3

A lithium secondary battery was produced in the same manner as in the inventive example 2, except that biphenyl was not included in the electrolyte liquid, and that a Zn foil which doubled as the anode active material was used as the anode current collector. The lithium secondary battery of the comparative example was chargeable, but not dischargeable. This is probably because the Zn foil of the anode was pulverized to make it difficult to collect electrons.

INDUSTRIAL APPLICABILITY

The lithium secondary battery of the present disclosure can be suitably used, for example, as a power storage device or a power storage system.

REFERENCE SIGNS LIST

10 Lithium secondary battery
20 Cathode
21 Cathode current collector
22 Cathode active material layer
30 Anode
31 Anode current collector
32 Anode active material
40 Separator
50 Electrolyte liquid
60 Container

The invention claimed is:
1. A lithium secondary battery, comprising:
a cathode;
an anode including an anode current collector and an anode active material; and
an electrolyte liquid which is in contact with the cathode and the anode,
wherein
the cathode includes a cathode current collector and a cathode active material layer which has been disposed on the cathode current collector;
the anode includes a material capable of forming an alloy with lithium during charge;
the electrolyte liquid contains lithium ions and the counter anions thereof;
the electrolyte liquid contains at least one substance selected from the group consisting of phenanthrene, biphenyl, triphenylene, acenaphthene, acenaphthylene, fluoranthene, and benzyl at a concentration of not less than 0.00625 mol/L and not more than 0.05 mol/L; and
the electrolyte liquid includes, as a solvent, at least one selected from the group consisting of a cyclic ether, a glyme and a sulfolane.

2. The lithium secondary battery according to claim 1, wherein
   the cyclic ether includes at least one selected from the group consisting of 2-methyltetrahydrofuran, tetrahydrofuran, 1,3-dioxolan, and 4-methyl-1,3-dioxolan.

3. The lithium secondary battery according to claim 1, wherein
   the glyme includes at least one selected from the group consisting of monoglyme, diglyme, triglyme, tetraglyme, and polyethylene glycol dimethyl ether.

4. The lithium secondary battery according to claim 1, wherein
   the sulfolane includes 3-methylsulfolane.

5. The lithium secondary battery according to claim 1, wherein
   the anode active material includes at least one selected from the group consisting of Al, Zn, Si, Sn, Ge, Cd, and Bi.

6. The lithium secondary battery according to claim 1, further comprising:
   a separator disposed between the cathode and the anode.

7. The lithium secondary battery according to claim 6, wherein
   the separator is formed of a material which allows the lithium ions and the substance to pass therethrough.

\* \* \* \* \*